US012184708B2

(12) United States Patent
Thiel

(10) Patent No.: US 12,184,708 B2
(45) Date of Patent: Dec. 31, 2024

(54) EXTRACTION OF USER REPRESENTATION FROM VIDEO STREAM TO A VIRTUAL ENVIRONMENT

(71) Applicant: Zoom Video Communications, Inc., San Jose, CA (US)

(72) Inventor: Jordan Thiel, Leander, TX (US)

(73) Assignee: Zoom Video Communications, Inc., San Jose, CA (US)

( * ) Notice: Subject to any disclaimer, the term of this patent is extended or adjusted under 35 U.S.C. 154(b) by 234 days.

(21) Appl. No.: 17/515,493

(22) Filed: Oct. 31, 2021

(65) Prior Publication Data

US 2023/0138434 A1 May 4, 2023

(51) Int. Cl.
*H04L 65/403* (2022.01)
*G06T 15/20* (2011.01)
*G06T 17/20* (2006.01)
*G06T 19/00* (2011.01)
*G06V 10/22* (2022.01)
*G06V 20/40* (2022.01)

(52) U.S. Cl.
CPC ............ *H04L 65/403* (2013.01); *G06T 15/20* (2013.01); *G06T 17/20* (2013.01); *G06T 19/006* (2013.01); *G06V 10/22* (2022.01); *G06V 20/46* (2022.01)

(58) Field of Classification Search
None
See application file for complete search history.

(56) References Cited

U.S. PATENT DOCUMENTS

| 5,850,352 | A | 12/1998 | Moezzi et al. |
| 10,205,910 | B2 | 2/2019 | Valli |
| 10,403,050 | B1 | 9/2019 | Beall et al. |
| 10,701,318 | B2 | 6/2020 | Valli |
| 11,184,362 | B1 | 11/2021 | Krol et al. |
| 11,733,826 | B2 | 8/2023 | Thiel |
| 2012/0050323 | A1* | 3/2012 | Baron, Jr. ............... G09G 5/14 345/632 |
| 2013/0249947 | A1 | 9/2013 | Reitan |

(Continued)

FOREIGN PATENT DOCUMENTS

WO      2019199569 A1     10/2019

OTHER PUBLICATIONS

International Search Report and Written Opinon mailed on Mar. 2, 2023 in corresponding PCT Application No. PCT/US2022/048343.

(Continued)

*Primary Examiner* — Hemant S Patel
(74) *Attorney, Agent, or Firm* — Young Basile Hanlon & MacFarlane, P.C.

(57) ABSTRACT

Methods, systems, and apparatus, including computer programs encoded on computer storage media relate to a method for extracting a user representation from a video stream to a virtual environment. The system may provide a video conference session in a virtual environment. The system may receive a video stream of a video conference participant. The system may extract a portion of the video stream depicting the video conference participant and generate a digital representation of the video conference participant based on the extracted video portion. The digital representation may comprise 2D or 3D representations. The system may provide the digital representation in the virtual environment.

20 Claims, 15 Drawing Sheets

(56) References Cited

U.S. PATENT DOCUMENTS

| | | | |
|---|---|---|---|
| 2013/0275231 A1 | 10/2013 | Paharia | |
| 2015/0091891 A1* | 4/2015 | Raheman | G06F 3/011 |
| | | | 345/419 |
| 2018/0118130 A1 | 5/2018 | Karabed | |
| 2018/0205888 A1* | 7/2018 | Tsukahara | H04N 7/15 |
| 2019/0018364 A1 | 1/2019 | Kim | |
| 2019/0065027 A1 | 2/2019 | Hauenstein et al. | |
| 2019/0253667 A1 | 8/2019 | Valli | |
| 2019/0355179 A1 | 11/2019 | Bortolini et al. | |
| 2020/0294317 A1 | 9/2020 | Segal | |
| 2020/0322395 A1 | 10/2020 | Copley et al. | |
| 2020/0402315 A1* | 12/2020 | Yerli | G06F 9/453 |
| 2022/0086203 A1 | 3/2022 | Morris et al. | |
| 2022/0157342 A1 | 5/2022 | Kliushkin et al. | |
| 2022/0286657 A1 | 9/2022 | Oz et al. | |
| 2022/0413433 A1* | 12/2022 | Parra Pozo | H04M 3/567 |

OTHER PUBLICATIONS

Cha Zhang et al: "Viewport : A Distributed, Immersive Teleconferencing System with Infrared Dot Pattern", IEEE Multimedia, IEEE Service Center, New York, NY, US, vol. 20, No. 1, Jan. 1, 2013 (Jan. 1, 2013), pp. 17-27, XP011493977, ISSN: 1070-986X, DOI: 10.1109/MMUL.2013.12 the whole document.

Fuchs Henry et al: "Immersive 3D Telepresence", IEEE Computer Society, IEEE, USA, vol. 47, No. 7, Jul. 1, 2014 (Jul. 1, 2014), pp. 46-52, XP011554133, ISSN: 0018-9162, DOI: 10.1109/MC.2014. 185 [retrieved on Jul. 11, 2014] the whole document.

Square, "What's the Difference Between and SDK and an API?" https://squareup.com/us/en/townsquare/sdk-vs-api, 2020. (Year: 2020).

\* cited by examiner

EXTRACTION OF USER REPRESENTATION FROM VIDEO STREAM TO A VIRTUAL ENVIRONMENT

FIELD

This application relates generally to video communications, and more particularly, to systems and methods for presenting a user from a video communications platform in a virtual environment.

SUMMARY

The appended claims may serve as a summary of this application.

DETAILED DESCRIPTION OF THE DRAWINGS

Figure 1A:
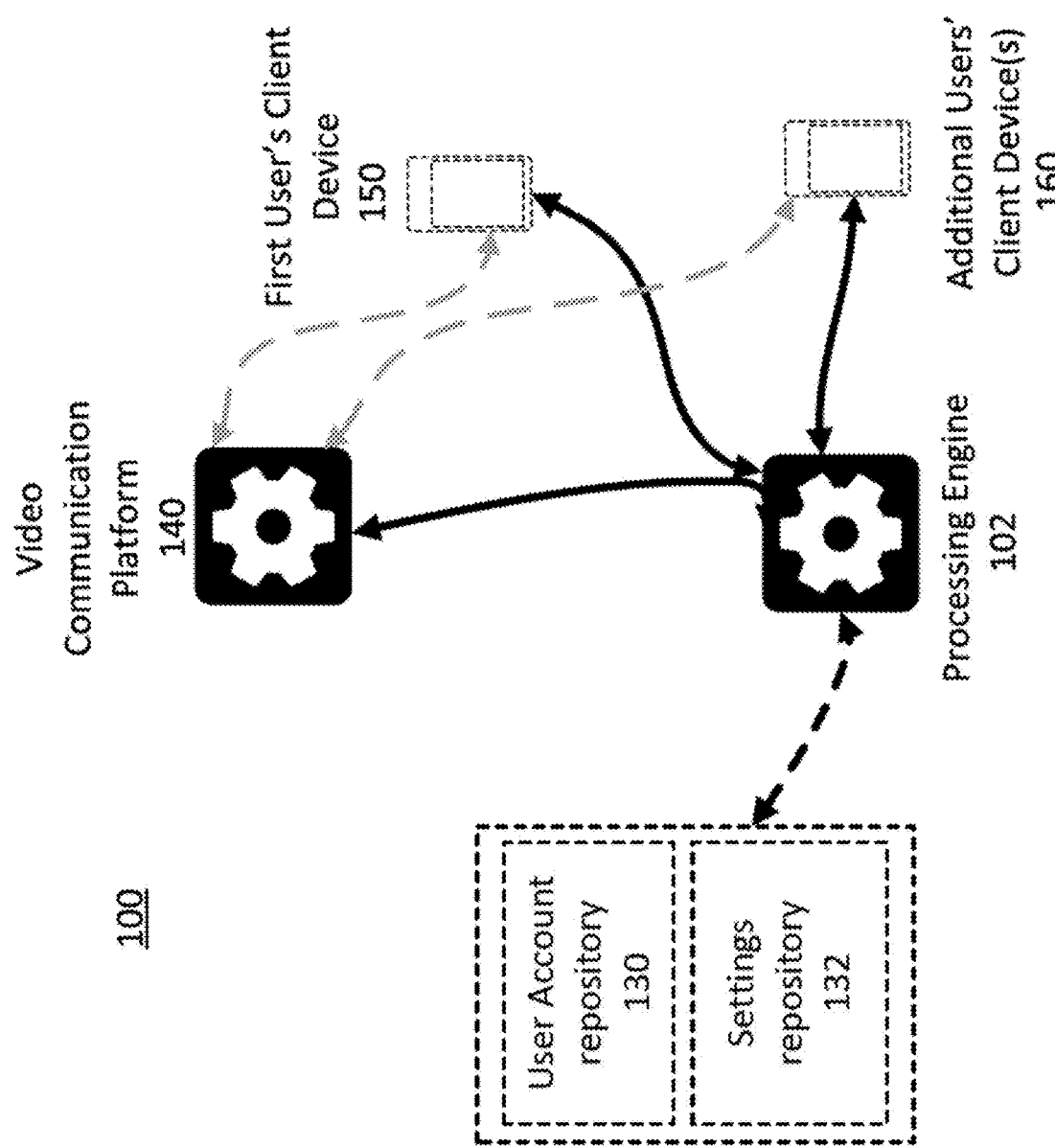
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

I. Exemplary Environments

FIG. 1A is a diagram illustrating an exemplary environment in which some embodiments may operate. In the exemplary environment 100, a first user's client device 150 and one or more additional users' client device(s) 160 are connected to a processing engine 102 and, optionally, a video communication platform 140. The processing engine 102 is connected to the video communication platform 140, and optionally connected to one or more repositories and/or databases, including a user account repository 130 and/or a settings repository 132. One or more of the databases may be combined or split into multiple databases. The first user's client device 150 and additional users' client device(s) 160 in this environment may be computers, and the video communication platform server 140 and processing engine 102 may be applications or software hosted on a computer or multiple computers which are communicatively coupled via remote server or locally.

The exemplary environment 100 is illustrated with only one additional user's client device, one processing engine, and one video communication platform, though in practice there may be more or fewer additional users' client devices, processing engines, and/or video communication platforms. In some embodiments, one or more of the first user's client device, additional users' client devices, processing engine, and/or video communication platform may be part of the same computer or device.

In an embodiment, processing engine 102 may perform the methods 540, 1000, 1100, 1200, or other methods herein and, as a result, provide for extracting a user representation from a video stream to a virtual environment. A virtual environment may comprise a VR environment or AR environment. In some embodiments, this may be accomplished via communication with the first user's client device 150, additional users' client device(s) 160, processing engine 102, video communication platform 140, and/or other device(s) over a network between the device(s) and an application server or some other network server. In some embodiments, the processing engine 102 is an application, browser extension, or other piece of software hosted on a computer or similar device or is itself a computer or similar device configured to host an application, browser extension, or other piece of software to perform some of the methods and embodiments herein.

In some embodiments, the first user's client device 150 and additional users' client devices 160 may perform the methods 540, 1000, 1100, 1200, or other methods herein and, as a result, provide for extracting a user representation from a video stream to a virtual environment. In some embodiments, this may be accomplished via communication with the first user's client device 150, additional users' client device(s) 160, processing engine 102, video communication platform 140, and/or other device(s) over a network between the device(s) and an application server or some other network server.

The first user's client device 150 and additional users' client device(s) 160 may be devices with a display configured to present information to a user of the device. In some embodiments, the first user's client device 150 and additional users' client device(s) 160 present information in the form of a user interface (UI) with UI elements or components. In some embodiments, the first user's client device 150 and additional users' client device(s) 160 send and receive signals and/or information to the processing engine 102 and/or video communication platform 140. The first user's client device 150 may be configured to perform functions related to presenting and playing back video, audio, documents, annotations, and other materials within a video presentation (e.g., a virtual class, lecture, webinar, or any other suitable video presentation) on a video communication platform. The additional users' client device(s) 160 may be configured to viewing the video presentation, and in some cases, presenting material and/or video as well. In some embodiments, first user's client device 150 and/or additional users' client device(s) 160 include an embedded or connected camera which is capable of generating and transmitting video content in real time or substantially real time. For example, one or more of the client devices may be smartphones with built-in cameras, and the smartphone operating software or applications may provide the ability to broadcast live streams based on the video generated by the built-in cameras. In some embodiments, the first user's client device 150 and additional users' client device(s) 160 are computing devices capable of hosting and executing one or more applications or other programs capable of sending and/or receiving information. In some embodiments, the first user's client device 150 and/or additional users' client device(s) 160 may be a computer desktop or laptop, mobile phone, video phone, conferencing system, virtual assistant, virtual reality or augmented reality device, wearable, or any other suitable device capable of sending and receiving information. In some embodiments, the processing engine 102 and/or video communication platform 140 may be hosted in whole or in part as an application or web service executed on the first user's client device 150 and/or additional users' client device(s) 160. In some embodiments, one or more of the video communication platform 140, processing engine 102, and first user's client device 150 or additional users' client devices 160 may be the same device. In some embodiments, the first user's client device 150 is associated with a first user account on the video communication platform, and the additional users' client device(s) 160 are associated with additional user account(s) on the video communication platform.

In some embodiments, optional repositories can include one or more of a user account repository 130 and settings repository 132. The user account repository may store and/or maintain user account information associated with the video communication platform 140. In some embodiments, user account information may include sign-in information, user settings, subscription information, billing information, connections to other users, and other user account information. The settings repository 132 may store and/or maintain settings associated with the communication platform 140. In some embodiments, settings repository 132 may include virtual environment settings, virtual reality (VR) settings, augmented reality (AR) settings, audio settings, video settings, video processing settings, and so on. Settings may include enabling and disabling one or more features, selecting quality settings, selecting one or more options, and so on. Settings may be global or applied to a particular user account.

Video communication platform 140 comprises a platform configured to facilitate video presentations and/or communication between two or more parties, such as within a video conference or virtual classroom. In some embodiments, video communication platform 140 enables video conference sessions between one or more users.

Figure 1B:
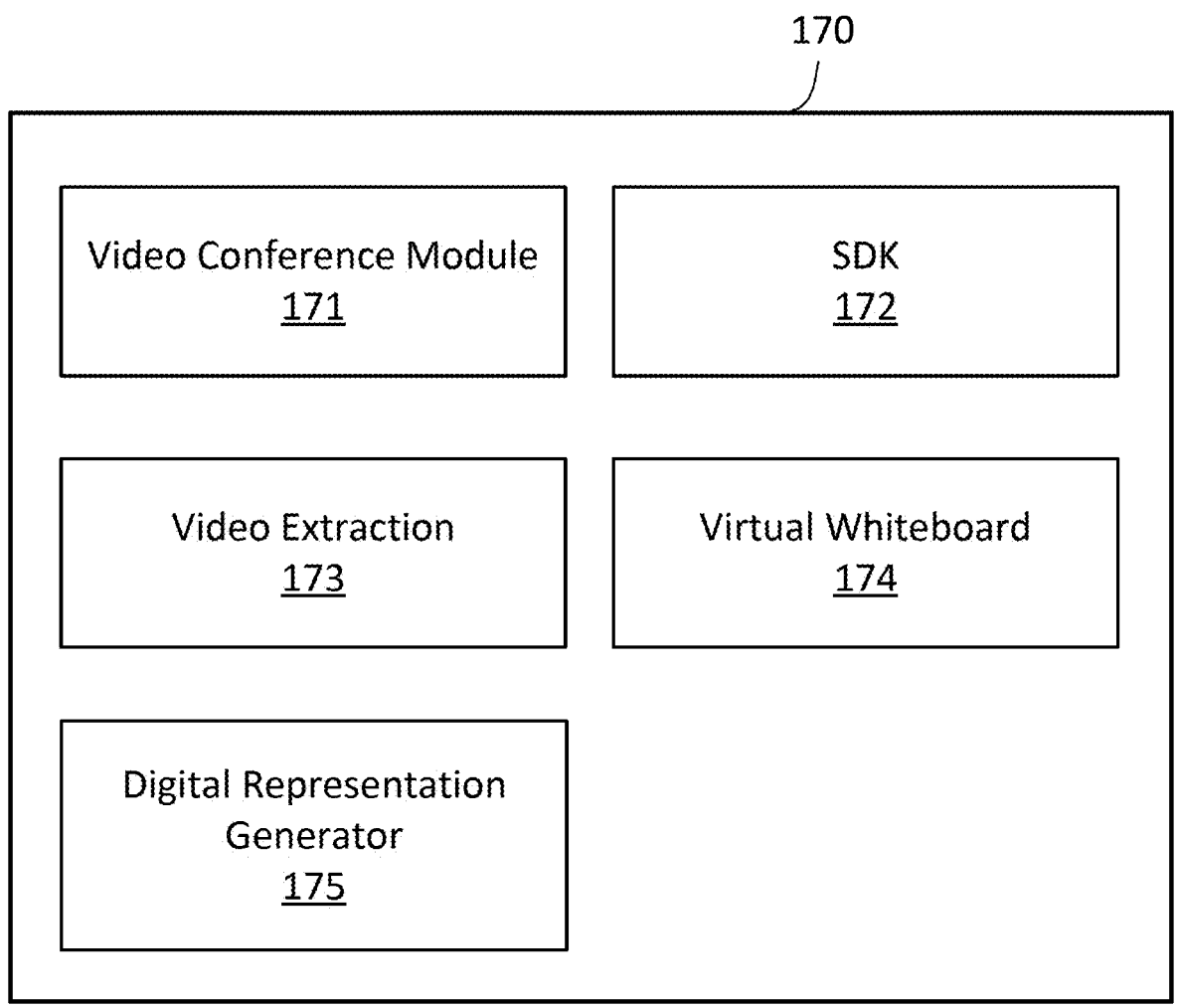
FIG. 1B is a diagram illustrating an exemplary computer system with software and/or hardware modules that may execute some of the functionality described herein.

FIG. 1B is a diagram illustrating an exemplary computer system 170 with software and/or hardware modules that may execute some of the functionality described herein. Computer system 170 may comprise, for example, a server or client device or a combination of server and client devices for extracting a user representation from a video stream to a virtual environment.

Video conference module 171 provides system functionality for providing video conferences between one or more video conference participants. Video conference module 171 may comprise part or all of the video communication platform 140 and/or processing engine 102. Video conference module 171 may host a video conference session that enables one or more participants to communicate over video. In some embodiments, video conference module 171 may require users to authenticate themselves to join a video conference, such as by providing credentials like a username and/or password. In some embodiments, video conference module 171 may allow guest users to join a video conference without authenticating themselves and may notify participants in the meeting that one or more unauthenticated participants are present. A video conference session may include one or more video streams that each display one or more of the participants, or other scenes such as a screenshare or a virtual environment as described herein. In an embodiment, synchronized audio may be provided with the video streams.

Software development kit (SDK) 172 provides system functionality for enabling an application to interface with the video conference module 171. In some embodiments, SDK 172 may comprise an application programming interface (API). SDK 172 may be distributed to enable software developers to use functionality of the video conference module 171 in first party or $3^{rd}$ party software applications. In some embodiments, SDK 172 may enable first party or $3^{rd}$ party software applications to provide video communication such as video conferencing via the video communication platform 140 and processing engine 102. In some embodiments, SDK 172 may enable VR or AR applications to integrate video communication into a virtual environment.

Video extraction module 173 provides system functionality for extracting a portion of video containing a user from video content containing the user and a background. In an embodiment, video extraction module 173 may remove a background from video content. In an embodiment, the video extraction module 173 may determine a boundary between a user in a video and the background. The video extraction module 173 may retain the portion of the video depicting the user and remove the portion of the video depicting the background. In an embodiment, the video extraction module 173 may optionally replace the background with a transparent or translucent background or may leave the background empty.

Virtual whiteboard 174 provides system functionality for a virtual collaboration space. In some embodiments, virtual whiteboard 174 may allow functionality such as creating and editing objects, drawing, erasing, creating and deleting text or annotations, and so on. In an embodiment, one or more participants in a video conference session may share one or more virtual whiteboards 174 where they may collaborate and share information. In some embodiments, the contents of one or more virtual whiteboards 174 may be stored for retrieval at a later date. In some embodiments, contents of one or more virtual whiteboards 174 may be combined with other virtual whiteboards 174, such as by importing the content of virtual whiteboard into another virtual whiteboard.

Digital representation generator 175 provides system functionality for generating a digital representation of a user. In an embodiment, the digital representation generator 175 may generate a digital representation of a video conference participant. In an embodiment, the digital representation of the video conference participant may be provided in a virtual environment. In an embodiment, the generated digital representation may use an extracted video of a video conference participant from video extraction module 173. In alternative variations, the generated digital representation may be generated based on a still image of the video conference participant. Alternatively, the generated digital representation may be based on configuration settings, such as avatar creation by a video conference participant. In an embodiment, the generated digital representation may comprise a 2D or 3D representation.

Digital representation generator 175 may be configured to generate one or several different types of digital representations. In one embodiment, the digital representation of the video conference participant may comprise extracted video of the video conference participant from video extraction module 173. In one embodiment, the digital representation of the video conference participant may comprise a flat shape displaying on a surface of the flat shape the extracted video of the video conference participant from video extraction module 173. In one embodiment, digital representation of the video conference participant may comprise a 3D mesh generated based on the extracted video of the video conference participant and displaying on the surface of the 3D mesh the extracted video of the video conference participant. In one embodiment, the digital representation of the video conference participant may comprise a 3D avatar. In one embodiment, the 3D avatar may be generated based on configuration settings of the video conference participant. Alternatively, the 3D avatar may be generated based on the extracted video of the video conference participant.

Figure 2:
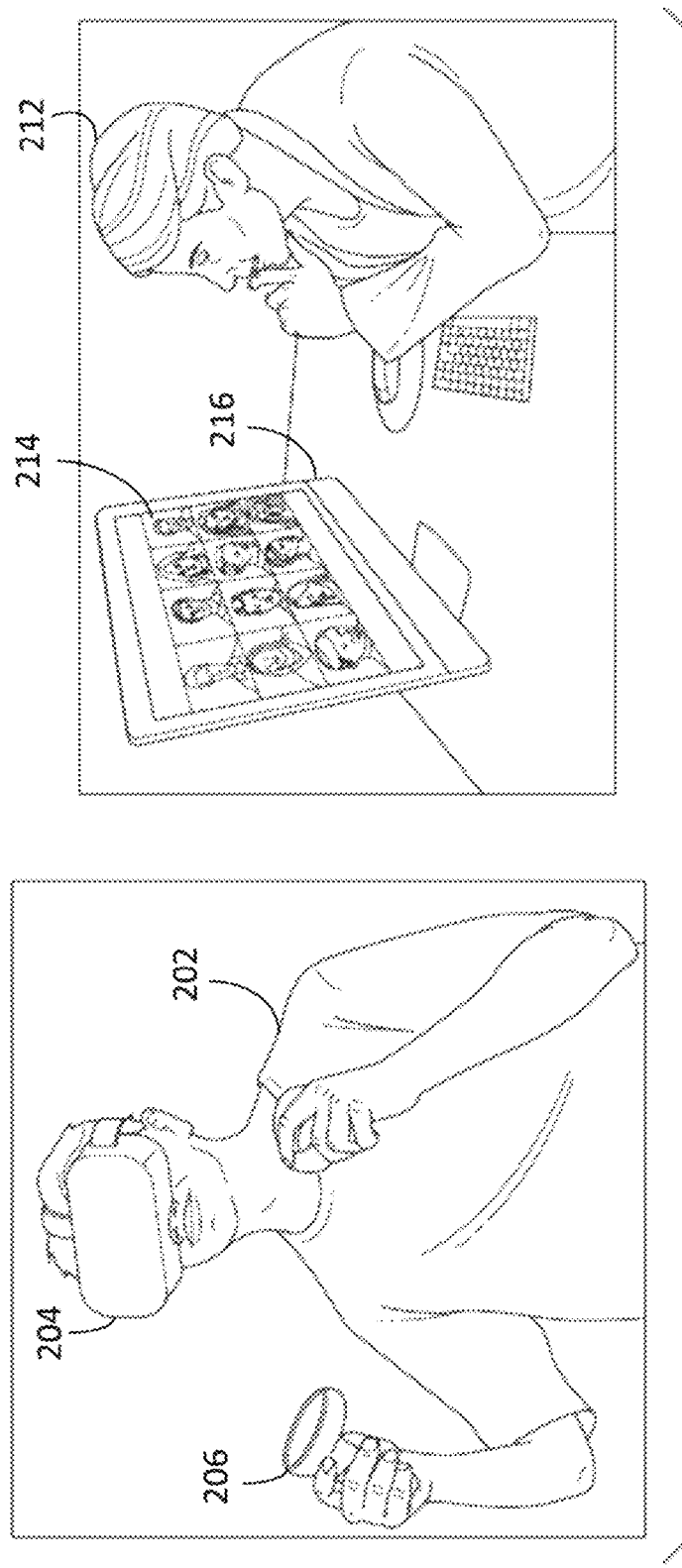
FIG. 2 illustrates one or more client devices that may be used to participate in a video conference and/or virtual environment.

FIG. 2 illustrates one or more client devices that may be used to participate in a video conference and/or virtual environment.

In an embodiment, a VR headset 204 may be worn by a VR user 202 to interact with a VR environment. The VR headset 204 may display 3D graphics to the VR user 202 to represent a VR environment, which may be generated by a VR application. Moreover, the VR headset 204 may track the movement of the VR user's head and/or other body parts to update its display to simulate an experience of being in the VR environment. In an embodiment, a VR headset 204 may optionally include controllers 206 to control the VR application. In some embodiments, the VR headset 204 may enable the VR user 202 to participate in a video conference within a VR environment.

Similarly, in an embodiment, an AR headset may be worn by an AR user to interact with an AR environment. The AR headset may display AR graphics, such as holograms, to the AR user to represent an AR environment, which may be generated by an AR application. The AR application may enable viewing a mixed reality environment that includes some AR objects and some real objects. Moreover, the AR headset may track the movement of the AR user's head or other body parts to update its display to simulate the AR environment. In an embodiment, an AR headset may optionally include controllers to control the AR application. In some embodiments, the AR headset may enable the AR user to participate in a video conference within an AR environment.

In an embodiment, a computer system 216 may provide a video conference application 214 that is communicably connected to video communication platform 140 and processing engine 102. The video conference application 214 may enable a video conference participant 212 to communicate with other participants on a video conference, including participants joining from video conference application 214 or VR headset 204 or an AR headset.

Figure 3:
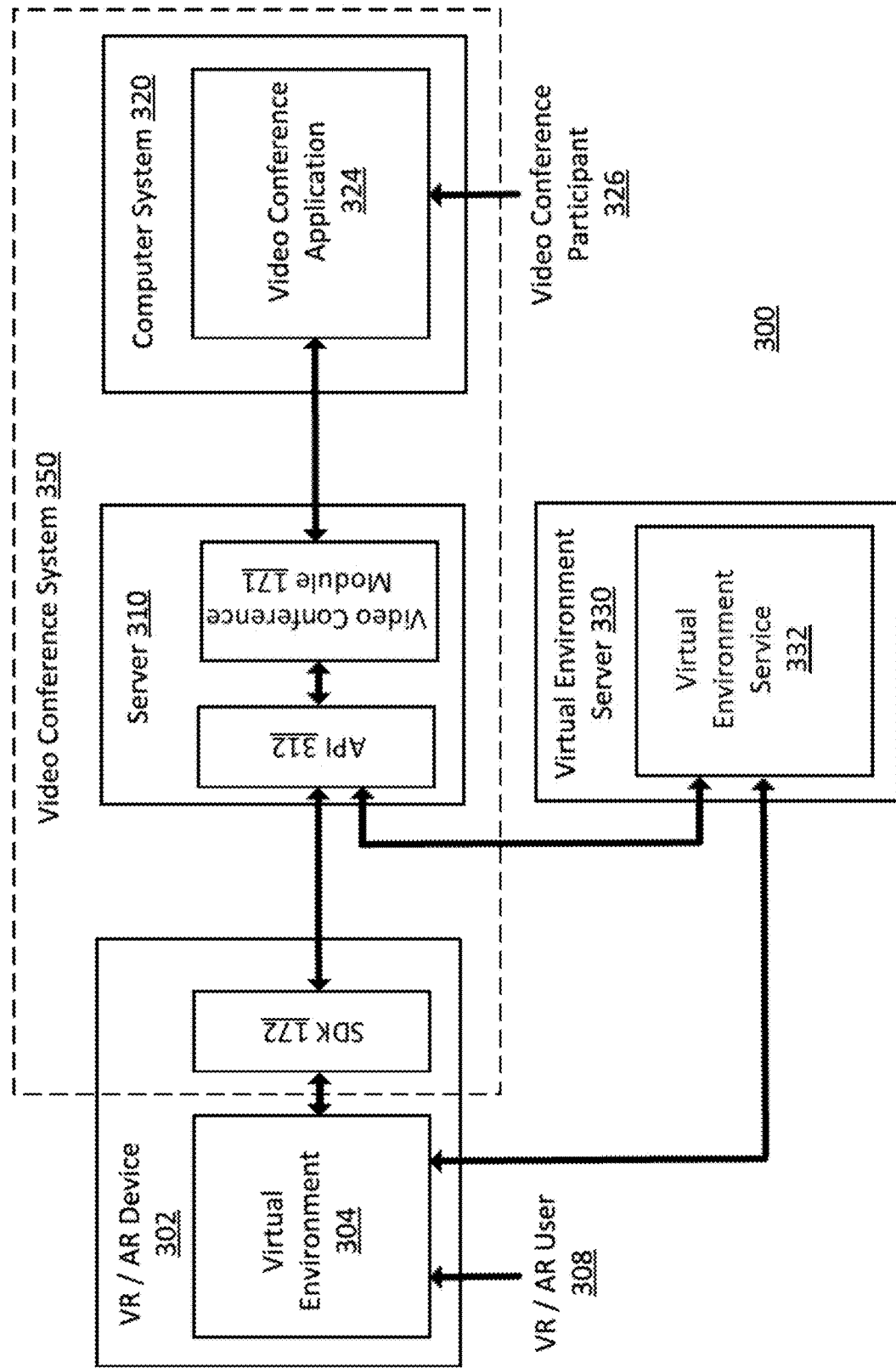
FIG. 3 is a diagram illustrating an exemplary environment in which some embodiments may operate.

FIG. 3 is a diagram illustrating an exemplary environment 300 in which some embodiments may operate. In an embodiment, computer system 320 provides a video conference application 324 that enables video conference participant 326 to join a video conference session. The video conference application 324 connects to server 310 hosting video conference module 171. The video conference module 171 may provide system functionality for hosting one or more video conference sessions and connecting one or more participants via video communication.

In an embodiment, a VR/AR device 302, which may comprise a VR or AR device such as a headset, displays a virtual environment 304, which may comprise a VR environment or AR environment. VR/AR user 308, which may comprise a VR or AR user, may interact with the virtual environment 304 using the VR/AR device 302. Virtual environment 304 may connect with SDK 172 on VR/AR device 302. SDK 172 enables the virtual environment 304, which may comprise a VR or AR application, to connect to API 312 on server 310. The API 312 may provide access to functionality of video conferencing module 171. Virtual environment 304 may be enabled to provide access to video conference sessions that may include other VR/AR users and video conference participant 326 through SDK 172, API 312, and video conference module 171.

In an embodiment, virtual environment 304 may connect to virtual environment service 332 on virtual environment server 330. In an embodiment, the virtual environment service 332 may host a backend of the virtual environment 304. The virtual environment service 332 may comprise data and functions for providing the virtual environment 304 to the VR/AR user 308. For example, virtual environment service 332 may store persistent objects and locations in the virtual environment 304 and maintain a consistent virtual world for experience by other VR/AR users who may also join the same virtual environment through their own VR/AR device. In an embodiment, the virtual environment service 332 may optionally connect to the API 312 to communicate data to and from the video conference module 171. For example, the virtual environment service 332 may transmit or receive global data about the virtual environment 304 with the video conference module 171. In an embodiment, the virtual environment server 330 may include a copy of SDK 172 for interfacing between virtual environment service 332 and API 312.

In an embodiment, the computer system 320, video conference application 324, server 310, video conference module 171, API 312, and SDK 172 may comprise aspects of a video conference system 350. In an embodiment, the virtual environment 304, virtual environment server 330, and virtual environment service 332 may comprise aspects of a $3^{rd}$ party VR or AR application. Alternatively, the virtual environment 304, virtual environment server 330, and virtual environment service 332 may comprise aspects of a first party VR/AR application that comprise further aspects of video conference system 350.

II. Exemplary Systems

Figure 4:
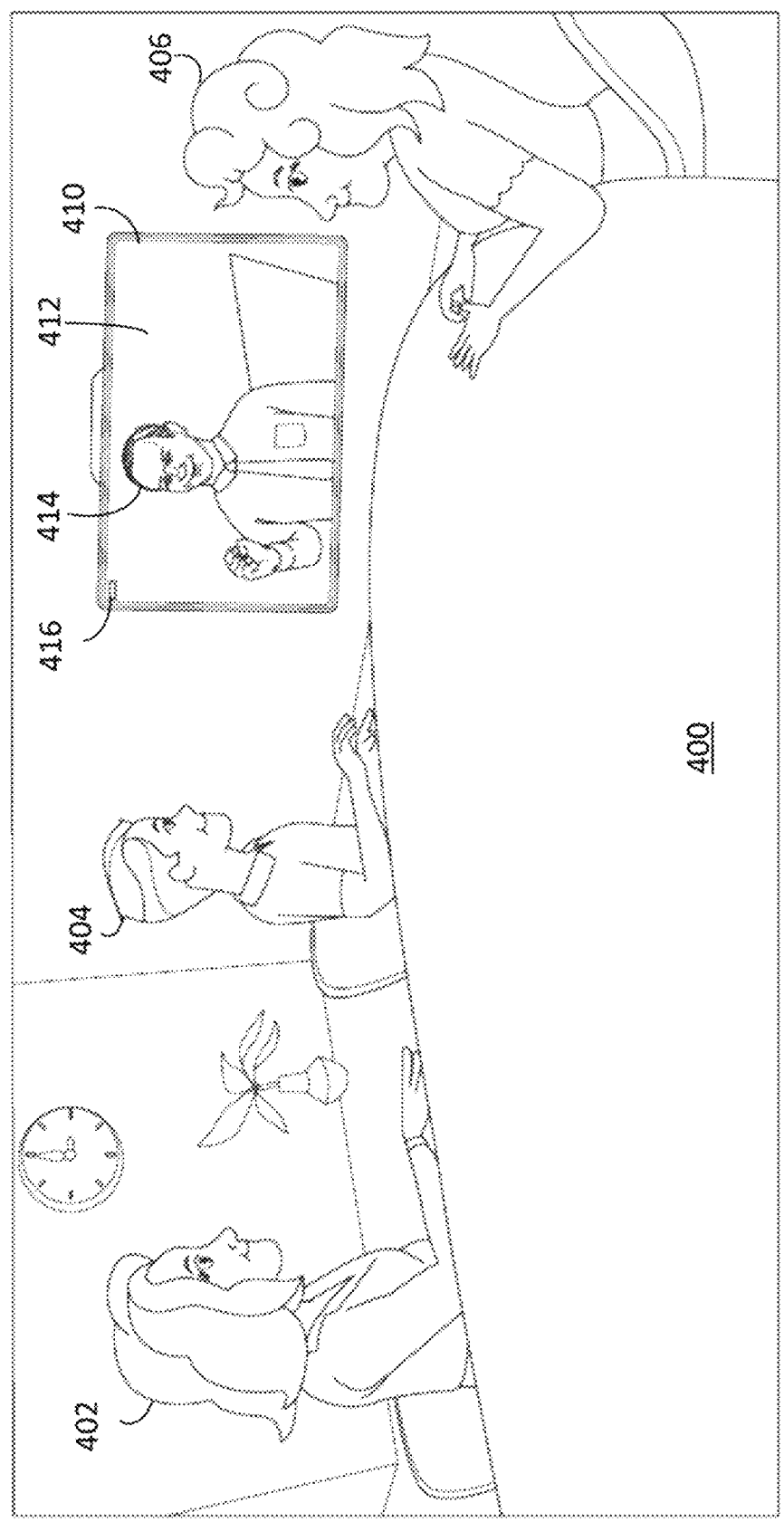
FIG. 4 illustrates an exemplary virtual environment according to one embodiment of the present disclosure.

FIG. 4 illustrates an exemplary virtual environment 400 according to one embodiment of the present disclosure. The virtual environment 400 may comprise a VR or AR environment such as a 3D world including digital representations, such as 3D avatars 402, 404, 406, of one or more users. Digital representations may also comprise 2D representations, such as images, videos, sprites, and so on. Each of the digital representations may represent a VR/AR user who is viewing and interacting with the virtual environment 400 from a VR/AR device. The virtual environment 400 may be displayed to each VR/AR user from the perspective of their digital representations. The virtual environment 400 is illustrated as an indoor conference room, but any other virtual environment may also be presented such as representations of outdoor areas, video game worlds, and so on.

Video conference view 410 in virtual environment 400 may display a video stream 412 including real-time video of video conference participant 414. The video may be captured from the camera of the computer system of the video conference participant 414. The VR or AR application may receive video stream 412 from video conference module 171 through SDK 172 and render the video stream 412 on the surface of a 3D object in the virtual environment 400, such as a 3D representation of a screen, projector, wall, or other object. In an embodiment, the video conferencing application may run in the virtual environment 400. VR or AR application may render a user interface 416 of the video conferencing application that may contain the video stream 412. The user interface 416 may also be rendered on the surface of a 3D object.

Figure 5A:
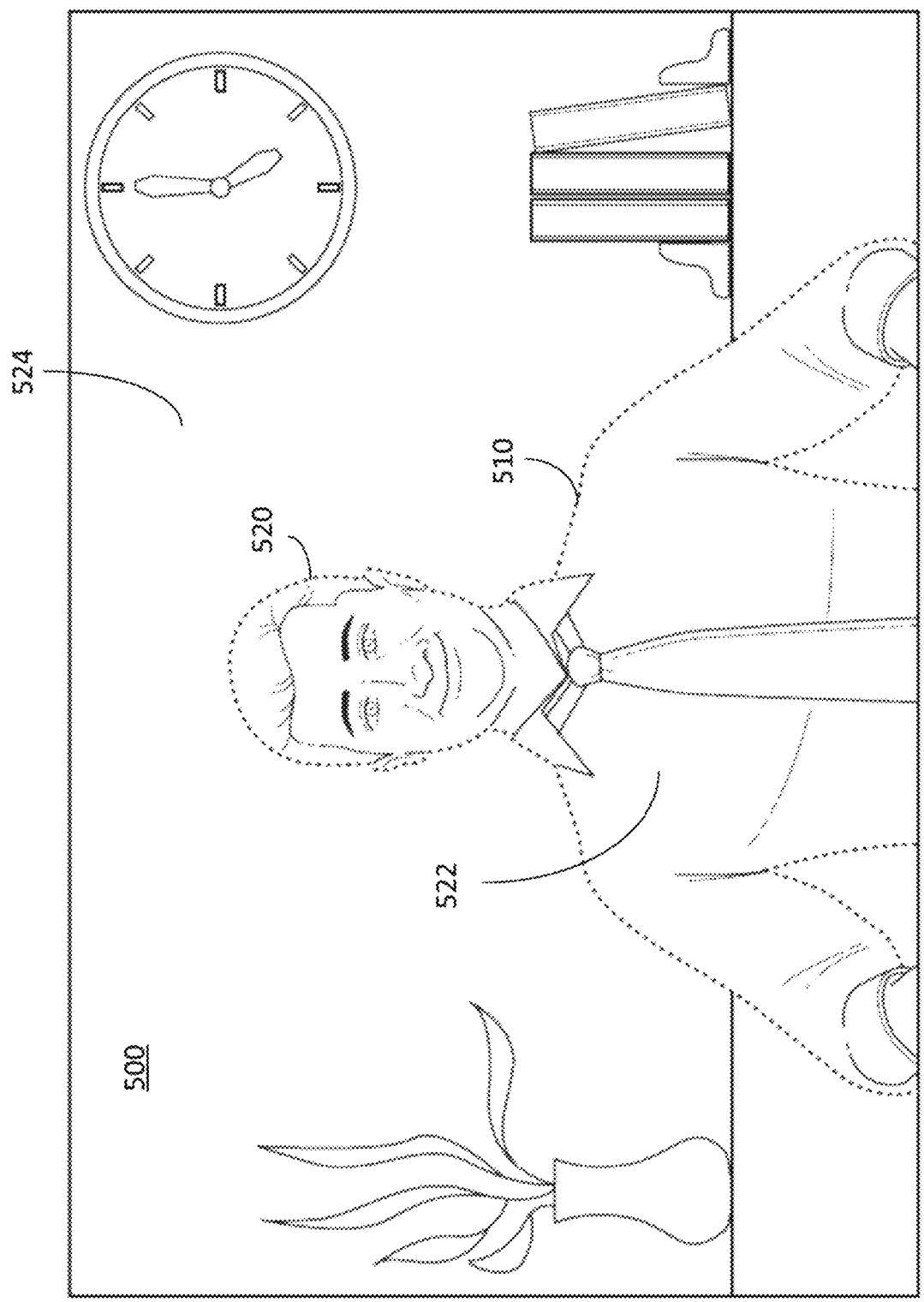
FIG. 5A illustrates an exemplary video of a user according to one embodiment of the present disclosure.

FIG. 5A illustrates an exemplary video of a user according to one embodiment of the present disclosure. In an embodiment, video 500 of a user 510 may be received from a camera. For example, the camera may comprise a built-in or external camera of a client device. In an embodiment, video extraction module 173 determines a boundary 520 between a user 510 in the video 500 and the background. In an embodiment, the boundary 520 may comprise an interior portion 522 and an exterior portion 524. In an embodiment, the interior portion 522 depicts imagery of the user 510 and the exterior portion depicts imagery of the background. The video extraction module 173 may retain the interior portion 522 of the video depicting the user 510 and remove the exterior portion 524 of the video depicting the background. In an embodiment, the video extraction module 173 may optionally replace the background with a transparent or translucent background or may leave the background empty.

In an embodiment, the video extraction module 173 may perform image processing to determine the boundary 520. In some embodiments, the image processing comprises edge detection, image segmentation, image matting, face detection, person detection, other image processing techniques, or a combination of techniques. Image processing may include artificial intelligence and/or machine learning.

In one embodiment, the video extraction module 173 may detect whether more than one person or user is present in the video 500. When more than one user is detected in the video 500, the video extraction module 173 may extract the users separately to create a plurality of video portions each depicting imagery of one user or may disable extraction of the users from the video background.

Figure 5B:
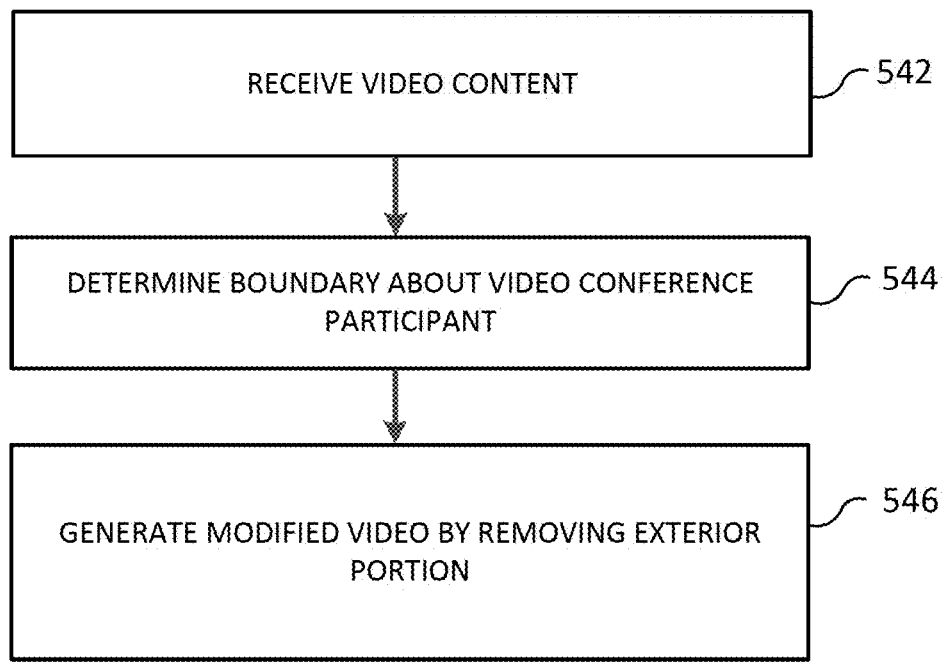
FIG. 5B is a flow chart illustrating an exemplary method that may be performed in some embodiments.

FIG. 5B is a flow chart illustrating an exemplary method 540 that may be performed in some embodiments.

At step 542, the video extraction module 173 receives video content 500 depicting imagery of a video conference participant 510, the video content 500 having multiple video frames. In some embodiments, the video content 500 is captured by a video camera attached or connected to the video conference participant's computer system 320. The video content 500 may be received at the computer system 320, the video communication platform 140, and/or processing engine 102.

At step 544, the video extraction module 173 determines a boundary 520 about the video conference participant 510 in the video frames, wherein the boundary 520 has an interior portion 522 and an exterior portion 524. In some embodiments, the interior portion 522 contains the video conference participant 510, including their face and/or body, and the exterior portion 524 contains all other content of the video frames, including foreground and background environment. The video extraction module 173 may perform image processing to determine a boundary 520 between the video conference participant 510 and the environment in the video frames. In some embodiments, the image processing comprises edge detection, image segmentation, image matting, face detection, person detection, other image processing techniques, or a combination of techniques. Image processing may include artificial intelligence and/or machine learning. In an embodiment, the boundary 520 may change in each video frame, for example, as the video conference participant 510 moves in the video content 500. In an embodiment, the video extraction module 173 may process each video frame to determine the boundary 520 per frame. In an embodiment, the boundary 520 may comprise edges on each side of the video conference participant 510 such as the top, bottom, left side, and right side. In an embodiment, the boundary 520 may comprise edges on only some of the sides of the video conference participant 510. The video extraction module 173 processing to determine the boundary 520 may be performed at the computer system 320, the video communication platform 140, and/or processing engine 102.

At step 546, the video extraction module 173 generates a modified video depicting the interior portion 522 depicting imagery of the video conference participant 510 by removing the exterior portion 524. In an embodiment, the video extraction module 173 may optionally replace the background with a transparent or translucent background or may leave the background empty.

In some embodiments, the video extraction module 173 may adjust the opacity of the exterior portion 524 of the video frames containing the environment to make the pixels of the exterior portion 524 transparent or translucent. In some embodiments, the video extraction module 173 may composite the interior portion 522 containing imagery of the video conference participant 510 with a transparent or translucent background that replaces the exterior portion 524 of the video frames containing the environment. As a result, the video extraction module 173 may remove from the video the exterior portion 524 of the video frames containing the environment.

In an embodiment, the SDK 172 may provide the modified video depicting the interior portion 522 depicting imagery of the video conference participant to a virtual environment 400 for display. Because the modified video may be displayed without a background, video imagery of the video conference participant 510 may be visible to other users in the virtual environment 400 without the distraction of the background. The areas of virtual environment 400 may be visible behind the video conference participant 510, without being blocked by background, which may allow reducing occlusion.

Figure 6:
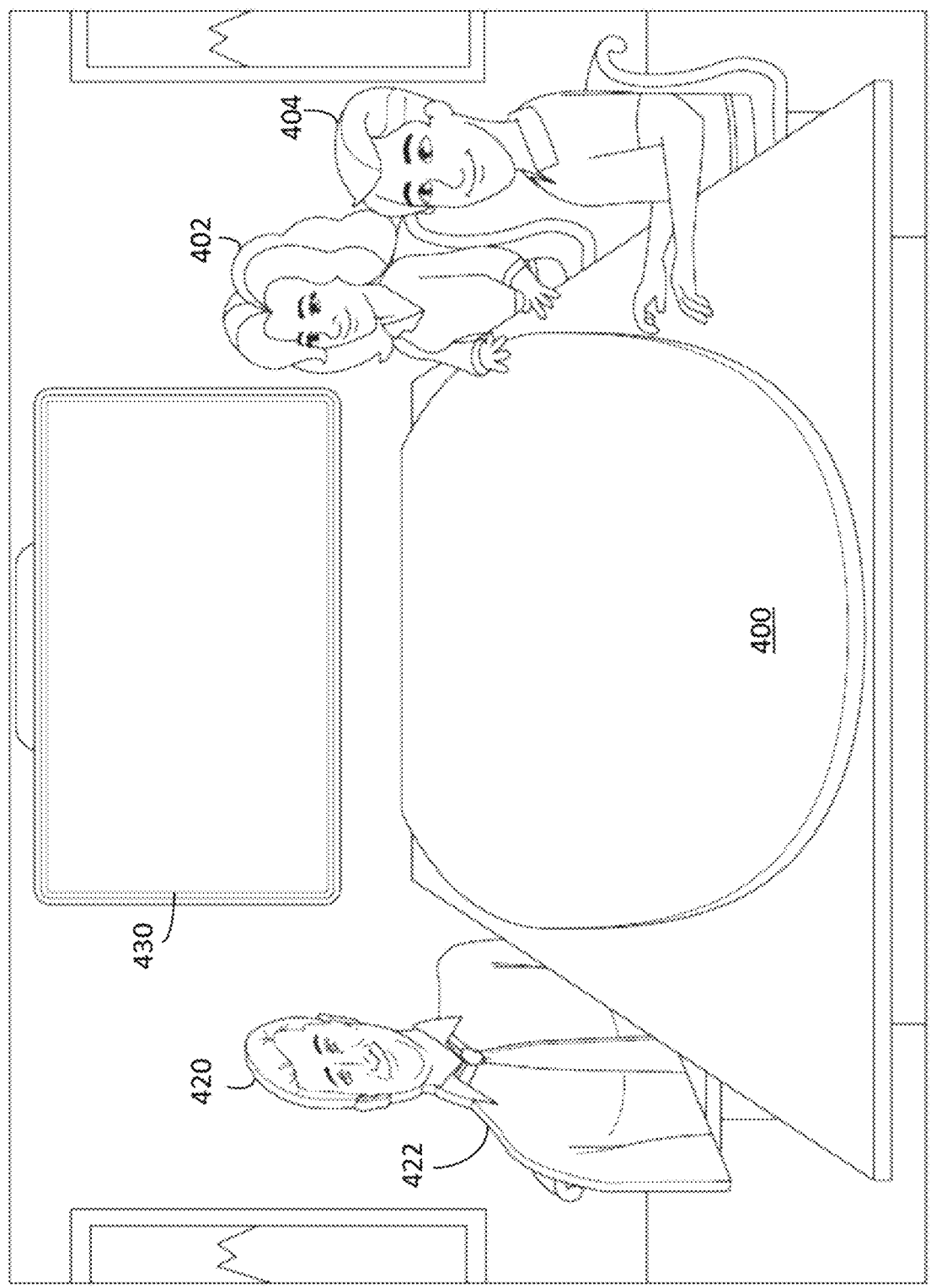
FIG. 6 illustrates an exemplary virtual environment according to one embodiment of the present disclosure.

In an alternative variation, the exterior portion 524 may not be removed entirely in step 546 and may be made more transparent or translucent by an adjustable opacity. Video extraction module 173 may generate a modified video depicting the interior portion 522 depicting imagery of the video conference participant 510 overlaid on exterior portion 524 with adjustable opacity. In an embodiment, the opacity may be set on a scale from 0% to 100% corresponding to fully transparent to fully opaque, respectively. In some embodiments, a video conference application displays an opacity control setting for adjusting the opacity of the background on which the video conference participant is overlaid in a video. In an embodiment, the video conference application receives an input opacity via the opacity control setting and adjusts the opacity of the background on which the first video conference participant is overlaid in the modified video according to the input opacity. In an embodiment, the opacity control setting may comprise a slider, menu, button, or other user interface controls. In some embodiments, the interior 522 and exterior portions 524 of the video frames comprise one or more pixels, and the system adjusts the opacity of the exterior portion 524 by adjusting the alpha values of the pixels of the exterior portion 524, where a minimum alpha value (e.g., 0) may correspond to fully transparent and a maximum alpha value may correspond to fully opaque FIG. 6 illustrates an exemplary virtual environment 400 according to one embodiment of the present disclosure. As described elsewhere herein, the virtual environment 400 may comprise a VR or AR environment such as a 3D world including digital representations, such as 3D avatars 402, 404, of one or more users. The virtual environment 400 may include a digital representation 420 of a video conference participant. Digital representation 420 may alternatively be referred to as an avatar, virtual character, or the like. The digital representation 420 of the video conference participant may be 2D or 3D. In an embodiment, the digital representation 420 of the video conference participant may comprise a video of the video conference participant. In an embodiment, the video may comprise a streaming video that plays in real-time. In an embodiment, the video of the video conference participant may be extracted by the video extraction module 173. In an embodiment, the video of the video conference participant may comprise the modified video depicting the interior portion 522 of video 500 depicting imagery of the video conference participant with the background removed. One digital representation 420 is illustrated, but more or fewer digital representations of other video conference participants may be provided in the virtual environment 400.

In an embodiment, one or more edges 422 of the digital representation 420 of the video conference participant match the shape of boundary 520 extracted by the video extraction module 173. In an embodiment, the edges all around the digital representation 420 of the video conference participant match the edges of boundary 520. Alternatively, one or more of the edges of the digital representation 420 of the video conference participant match one or more edges of boundary 520. In an embodiment, the exterior portion 524 of the video 500 of the video conference participant is not displayed in the digital representation 420 of the video conference participant. In an embodiment, the area of the digital representation outside of the edges 422 is empty, and the virtual environment 400 is not occluded and is visible in the area outside of the edges 422.

In an embodiment, the digital representation 420 of the video conference participant may have a location and/or facing direction in the virtual environment 400. For example, the location may comprise coordinates and the facing direction may comprise one or more rotations, quaternions, or so on. In one embodiment, the location and/or facing direction may be modified, which may allow the digital representation 420 of the video conference participant to be moved to different locations in the virtual environment 400 and/or be faced in different directions. In one embodiment, one or more locations in the virtual environment 400 may be selectable, and the digital representation 420 of the video conference participant may be moved to and displayed at a selected location. In an embodiment, the digital representation 420 of the video conference participant may be displayed in a seat, in a standing location, or elsewhere in the virtual environment 400.

In one embodiment, the digital representation 420 of the video conference participant may comprise a 2D video. For example, the digital representation 420 of the video conference participant may comprise a streaming video or sprite. In one embodiment, the 2D video of the video participant may be displayed from the same perspective, such as a head-on view, no matter which direction it is viewed from by other users in the virtual environment 400.

Alternatively, the digital representation 420 of the video conference participant may comprise a flat cut out. For example, the digital representation 420 of the video conference participant may comprise a flat shape and the modified video of the video conference participant may be displayed on the flat shape. The flat shape may comprise one or more polygons. In an embodiment, the video of the video conference participant is displayed on a flat surface of the shape. One or more edges of the shape may match the shape of boundary 520 extracted by the video extraction module 173. The flat shape may have a location and/or facing direction in the virtual environment 400 and may appear from different perspectives in the virtual environment 400 depending on the direction from which it is viewed.

The digital representation 420 of the video conference participant may also comprise other representations as described elsewhere herein. In an embodiment, the digital representation 420 of the video conference participant may be partially or completely transparent or translucent to allow displaying areas of the virtual environment behind the digital representation 420. For example, the opacity of the digital representation 420 of the video conference participant may be adjustable. In an embodiment, virtual environment 400 may optionally include a virtual whiteboard 430. The virtual whiteboard 430 may include one or more user interface controls for adding and editing content on the virtual whiteboard 430.

Figure 7:
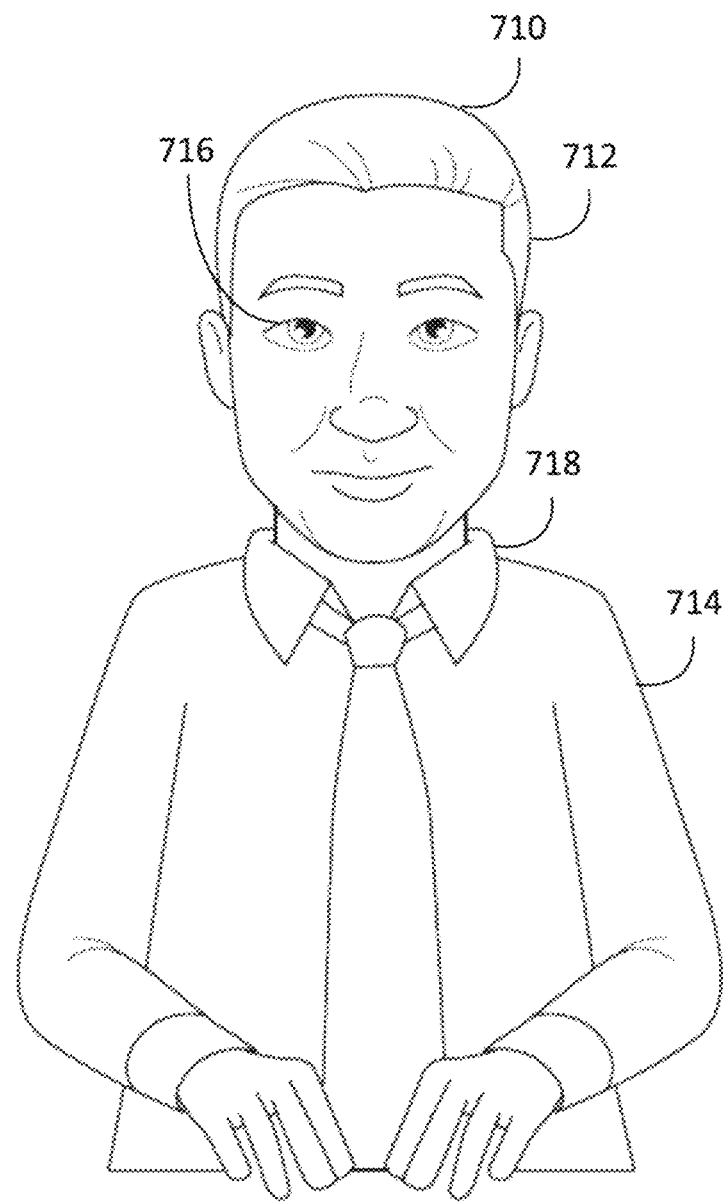
FIG. 7 illustrates an exemplary digital representation of a video conference participant according to one embodiment of the present disclosure.

FIG. 7 illustrates an exemplary digital representation of a video conference participant according to one embodiment of the present disclosure. In an embodiment, digital representation 420 of the video conference participant may comprise 3D avatar 710. 3D avatar 710 of the video conference participant may be displayed in the virtual environment 400 to represent the video conference participant 326.

In an embodiment, video conference system 350 may include an avatar creation system for allowing customization of 3D avatar 710. In an embodiment, the head 712, body 714, face 716, clothing 718, and/or other aspects of the 3D avatar 710 may be customizable. In an embodiment, the avatar creation system may display an avatar creation screen for selecting customizable attributes of the 3D avatar 710.

In an embodiment, the avatar creation system may generate 3D avatar 710 by analyzing video 500 of the video conference participant. In an embodiment, the video conference system 350 may use artificial intelligence and/or machine learning to analyze the interior portion 522 of the video 500 depicting imagery of the video conference participant and generate 3D avatar 710 based on the imagery of the video conference participant. In an embodiment, the 3D avatar 710 may change between different video conference sessions based on changes to the imagery of the video conference participant. For example, changes in the hair style or clothing of the video conference participant between video conference sessions may cause changes to the 3D avatar 710 between different video conference sessions. Alternatively, the avatar creation system may perform the same techniques on a still image captured of the video conference participant.

In an embodiment, the avatar creation system may identify, from a photo or video, characteristics of one or more facial features of the video conference participant and select one or more facial features for the 3D avatar 710 from a predefined set of facial features based on the amount of similarity to the characteristics. In an embodiment, the avatar creation system may identify, from a photo or video, characteristics of one or more body parts of the video conference participant and select one or more body parts for the 3D avatar 710 from a predefined set of body parts based on the amount of similarity to the characteristics. In an embodiment, the avatar creation system may identify, from a photo or video, characteristics of one or more clothing items of the video conference participant and select one or more clothing items for the 3D avatar 710 from a predefined set of clothing items based on the amount of similarity to the characteristics.

In an embodiment, the avatar creation system may include one or more default 3D avatars to enable the video conference participant to appear anonymously. In an embodiment, default 3D avatars may include one or more generic avatars that do not have identifying features of the video conference participant. In an embodiment, one or more plain 3D avatars that do not look like the video conference participant may be selected by the user and displayed as a digital representation 420.

Figure 8:
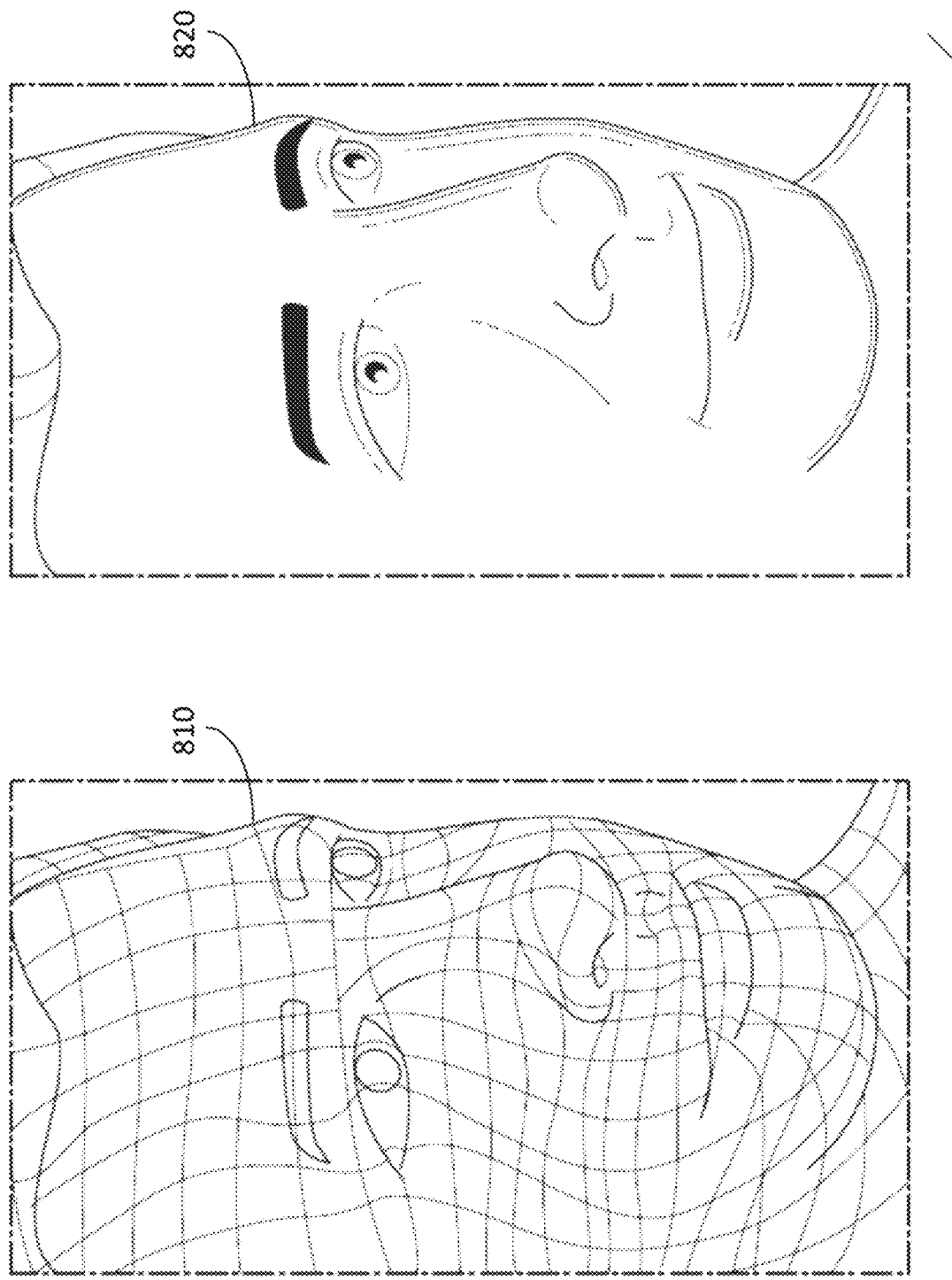
FIG. 8 illustrates an exemplary digital representation of a video conference participant according to one embodiment of the present disclosure.

FIG. 8 illustrates an exemplary digital representation of a video conference participant according to one embodiment of the present disclosure. In an embodiment, digital representation 420 of the video conference participant may comprise textured 3D mesh 820. Textured 3D mesh 820 may be displayed in the virtual environment 400 to represent the video conference participant 326.

In an embodiment, video conference system 350 may comprise a mesh generator. The mesh generator may receive as input video 500 of the video conference participant. In an embodiment, the interior portion 522 of the video 500 is extracted to enable the mesh generator to analyze the portion of video containing the video conference participant. In an embodiment, the mesh generator analyzes imagery of the video conference participant to reconstruct volumetric information of the face and/or body of the video conference participant based on the pixels of the video or image. In one embodiment, volumetric information may comprise one or more 3D points, a depth map, or other volumetric information. The mesh generator may convert the volumetric information into a 3D mesh 810. In an embodiment, the mesh generator may comprise an artificial intelligence and/or machine learning module, which may be trained to convert 2D images or video into 3D meshes.

In one embodiment, video of the video conference participant is displayed on the 3D mesh to generate a textured 3D mesh 820. In an embodiment, the textured 3D mesh 820 is textured with streaming video of the video conference participant. For example, the video may comprise the modified video depicting the interior portion 522 of video 500.

Figure 9:
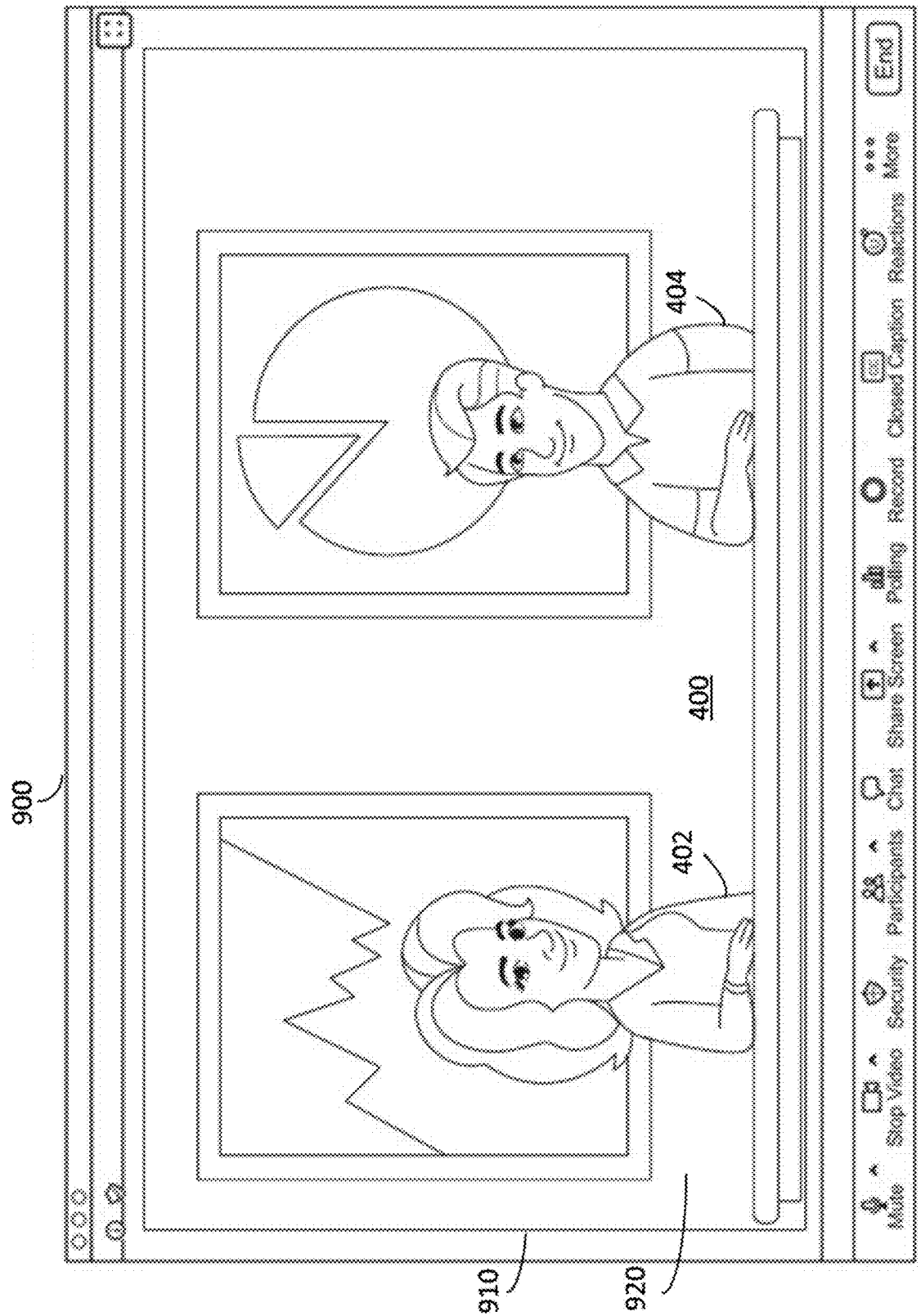
FIG. 9 illustrates an exemplary user interface according to one embodiment of the present disclosure.

FIG. 9 illustrates an exemplary user interface 900 according to one embodiment of the present disclosure. User interface 900 may comprise the interface of a video conferencing application. Content view 910 displays a view of the virtual environment 400, including the 3D avatars 402, 404 of participants in the video conference. The content view 910 may comprise video content 920, such as streaming video, captured from a virtual camera in the virtual environment 400. The video content may be encoded in streaming video format by an encoder on a VR/AR device 302 or a server 310. In some embodiments, the encoder may comprise SDK 172. In an embodiment, the video content may comprise 2D video formats such as MP4, MP3, AVI, FLV, WMV, and other formats. The video content may be transmitted from the VR/AR device 302 to the video conference module 171 of the server 310 and on to the computer system 320 and video conference application 324. User interface 900 may be displayed on a computer system to a video conference participant 326.

In an embodiment, video content 920 may be captured from the viewpoint of the digital representation 420 of the video conferencing participant. For example, video content 920 may be captured of the virtual environment 400 from the location and/or facing direction of the digital representation 420 of the video conferencing participant. In an embodiment, video content 920 may be captured from the location and/or facing direction of the eyes, head, chest, or other portion of the digital representation 420 of the video conferencing participant. The video content 920 may enable the video conference participant to view the virtual environment 400 from the perspective of where the digital representation 420 of the video conference participant is displayed in the virtual environment 400.

In an embodiment, video content 920 may be captured by a virtual camera. The virtual camera may capture a view of the virtual environment 400 comprising a viewport. The viewport may comprise a view of a 3D environment that is captured from a position in the 3D environment. The virtual camera may generate video content based on the portion of the 3D environment that is within the viewport for transmitting to a video conference application.

In an embodiment, the virtual camera may be located at the viewpoint of the digital representation 420 of the video conferencing participant. For example, the virtual camera may have the same location and/or facing direction as the location and facing direction of the digital representation 420 of the video conferencing participant. In an embodiment, virtual camera may have the same location and/or facing direction as the location and facing direction of the eyes, head, chest, or other portion of the digital representation 420 of the video conferencing participant.

In an embodiment, the viewpoint for capturing video content 920 may change when the video conference participant moves the digital representation 420 to a new location and/or facing direction in the virtual environment. In an embodiment, the video content 920 may be captured from the new location and/or facing direction. In an embodiment, the virtual camera may be moved to the new location and/or facing direction.

Figure 10:
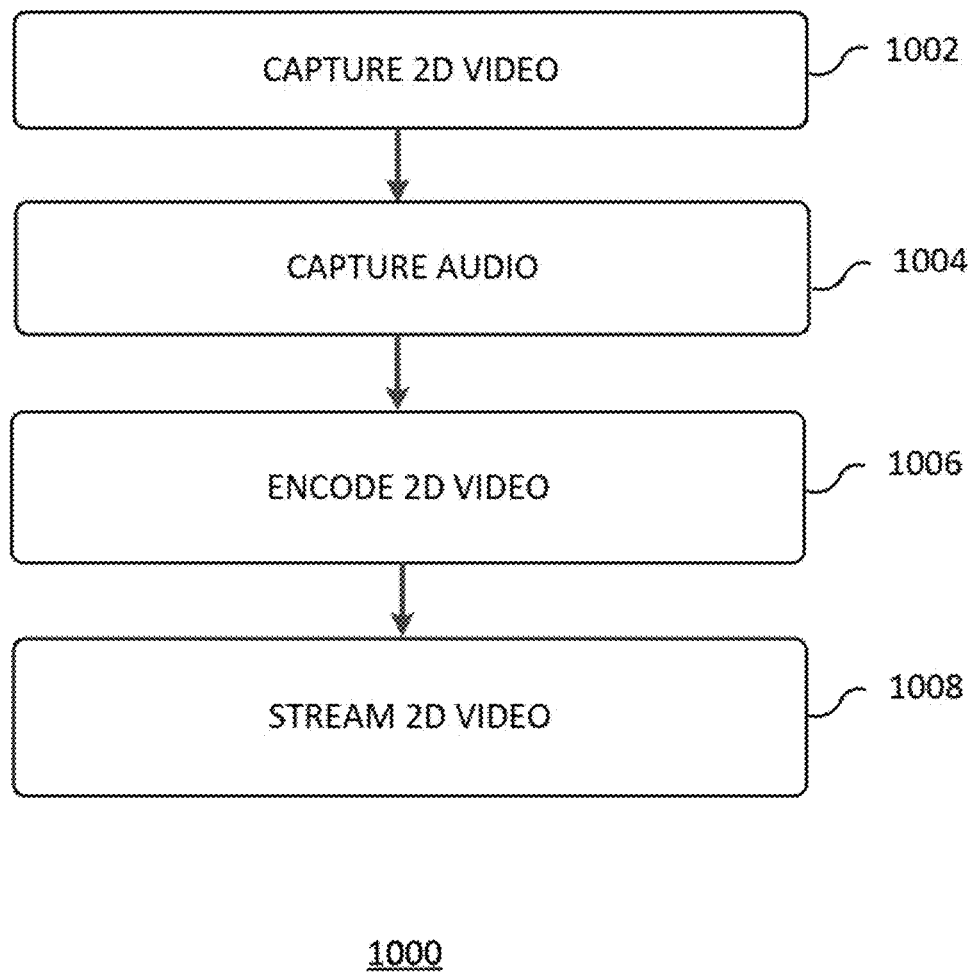
FIG. 10 illustrates an exemplary method that may be performed in some embodiments.

FIG. 10 illustrates an exemplary method 1000 that may be performed in some embodiments. Video content may be captured from the virtual environment 400 in many different ways, and method 1000 comprises one exemplary method for doing so. At step 1002, a video conference application or VR/AR application captures 2D video of a 3D virtual environment. In an embodiment, the 2D video may be captured from the viewport of a virtual camera. At step 1004, the video conference application or VR/AR application may capture audio output from the virtual environment and/or from the microphone input of the VR/AR device. At step 1006, the video conference application or VR/AR application may encode the 2D video. In some embodiments, the 2D video may be encoded into a streaming video format and may include the audio output. The encoding may be compressed or uncompressed. At step 1008, the video conference application may stream the 2D video to a video conference module and one or more client devices.

III. Exemplary Methods

Figure 11:
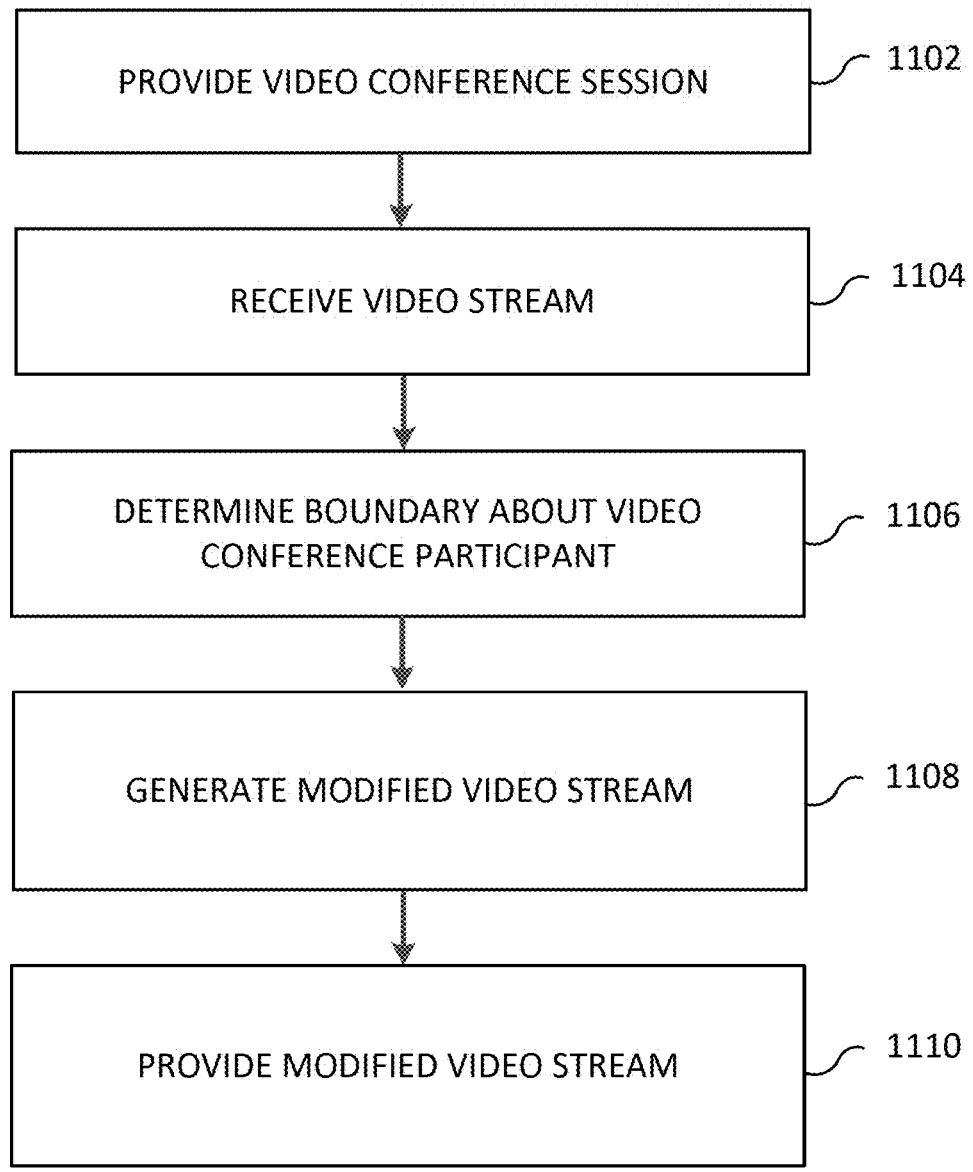
FIG. 11 illustrates an exemplary method that may be performed in some embodiments.

FIG. 11 illustrates an exemplary method 1100 that may be performed in some embodiments.

At step 1102, a video conference session may be provided in a virtual environment. In an embodiment, the video conference session is hosted on a server and may connect a plurality of video conference participants. In an embodiment, the video conference session may connect one or more VR/AR users in the virtual environment and one or more video conference participants joining from one or more computer systems.

At step 1104, a video stream is received of a video conference participant. In an embodiment, the video stream may be received from a video conference application.

At step 1106, a boundary is determined about the video conference participant in the video stream, wherein the boundary has an interior portion and an exterior portion, the interior portion depicting the video conference participant and the exterior portion depicting a background of the video conference participant. In an embodiment, boundary may be determined by a video extraction module 173.

At step 1108, the video stream is processed to generate a modified video stream comprising the interior portion depicting the video conference participant without the exterior portion depicting the background. In an embodiment, the modified video stream may be generated by video extraction module 173 performing one or more aspects of method 540 or other methods herein.

At step 1110, the modified video stream is provided in the virtual environment as a digital representation of the video conference participant. Optionally, a second video stream of the virtual environment captured by a virtual camera located at a viewpoint of the digital representation of the video conference participant may be provided in the video conference session. The second video stream may be displayed in the video conference application.

Figure 12:
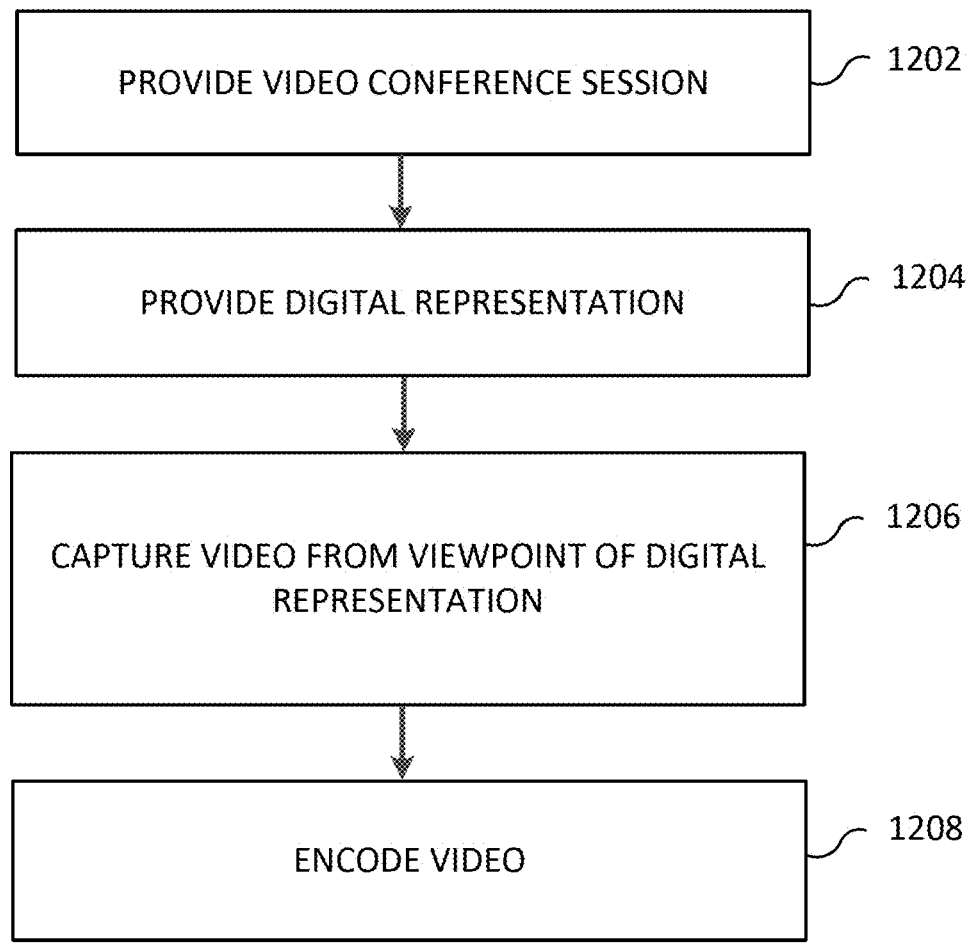
FIG. 12 illustrates an exemplary method that may be performed in some embodiments.

FIG. 12 illustrates an exemplary method 1200 that may be performed in some embodiments.

At step 1202, a video conference session may be provided in a virtual environment. In an embodiment, the video conference session is hosted on a server and may connect a plurality of video conference participants. In an embodiment, the video conference session may connect one or more VR/AR users in the virtual environment and one or more video conference participants joining from one or more computer systems.

At step 1204, a digital representation of a video conference participant is provided in the virtual environment. In an embodiment, the digital representation may comprise a 2D or 3D representation of the video conference participant. In one embodiment, the digital representation may comprise streaming video of the video conference participant.

At step 1206, video content is captured from a virtual camera located at a viewpoint of the digital representation of the video conference participant in the virtual environment. In one embodiment, the virtual camera may have the same location and facing direction as the location and facing direction of the digital representation of the video conference participant.

At step 1208, the video content is encoded to generate a video stream in the video conference session. In an embodiment, video stream may be displayed in the video conference application.

Exemplary Computer System

Figure 13:
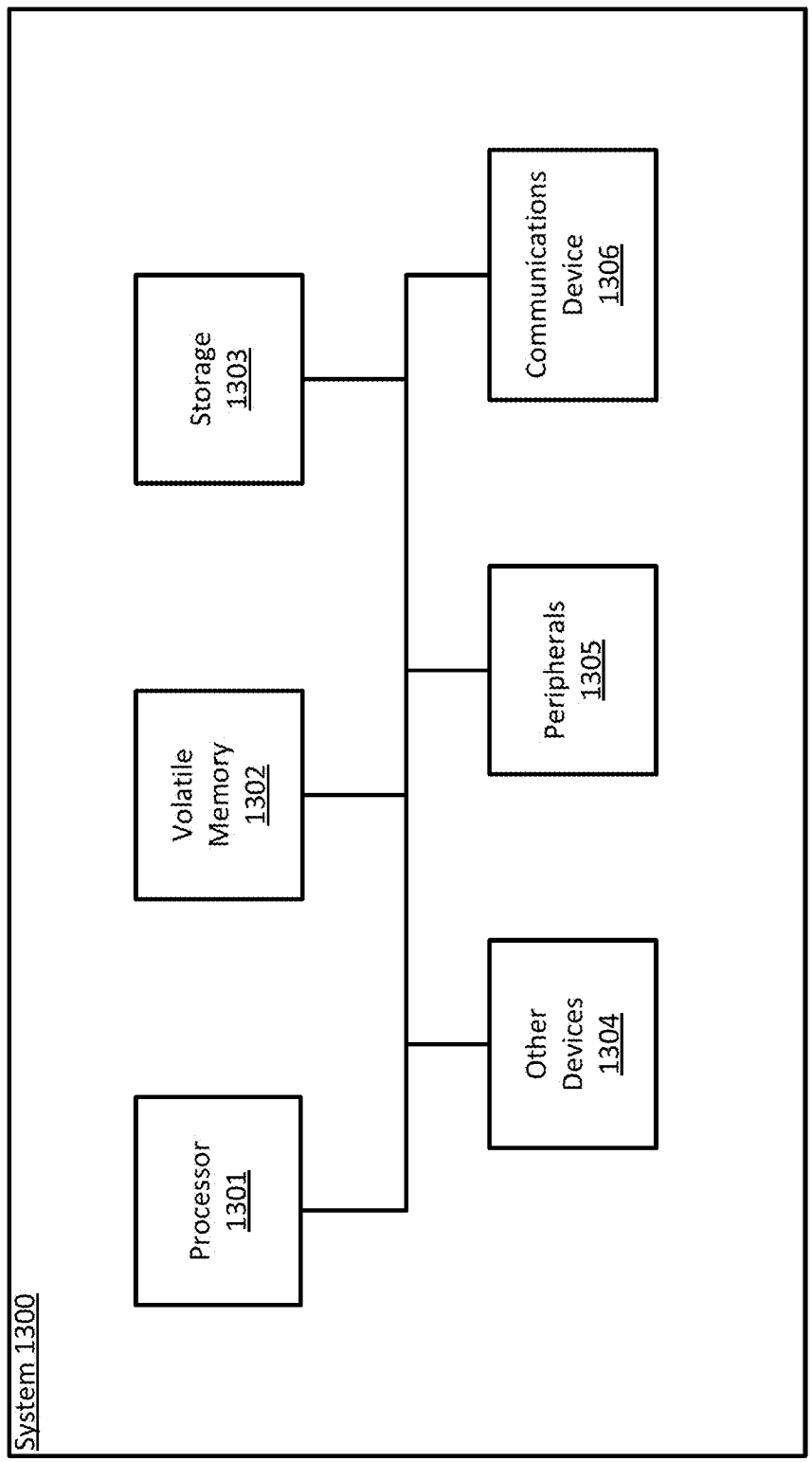
FIG. 13 is a diagram illustrating an exemplary computer that may perform processing in some embodiments.

FIG. 13 is a diagram illustrating an exemplary computer that may perform processing in some embodiments. Exemplary computer 1300 may perform operations consistent with some embodiments. The architecture of computer 1300 is exemplary. Computers can be implemented in a variety of other ways. A wide variety of computers can be used in accordance with the embodiments herein.

Processor 1301 may perform computing functions such as running computer programs. The volatile memory 1302 may provide temporary storage of data for the processor 1301. RAM is one kind of volatile memory. Volatile memory typically requires power to maintain its stored information. Storage 1303 provides computer storage for data, instructions, and/or arbitrary information. Non-volatile memory, which can preserve data even when not powered and including disks and flash memory, is an example of storage. Storage 1303 may be organized as a file system, database, or in other ways. Data, instructions, and information may be loaded from storage 1303 into volatile memory 1302 for processing by the processor 1301.

The computer 1300 may include peripherals 1305. Peripherals 1305 may include input peripherals such as a keyboard, mouse, trackball, video camera, microphone, and other input devices. Peripherals 1305 may also include output devices such as a display. Peripherals 1305 may include removable media devices such as CD-R and DVD-R recorders/players. Communications device 1306 may connect the computer 1300 to an external medium. For example, communications device 1306 may take the form of a network adapter that provides communications to a network. A computer 1300 may also include a variety of other devices 1304. The various components of the computer 1300 may be connected by a connection medium such as a bus, crossbar, or network.

It will be appreciated that the present disclosure may include any one and up to all of the following examples.

Example 1: A method comprising: providing a video conference session in a virtual environment; receiving a video stream of a video conference participant; determining a boundary about the video conference participant in the video stream, wherein the boundary has an interior portion and an exterior portion, the interior portion depicting the video conference participant and the exterior portion depicting a background of the video conference participant; processing the video stream to generate a modified video stream comprising the interior portion depicting the video conference participant without the exterior portion depicting the background; providing the modified video stream in the virtual environment as a digital representation of the video conference participant.

Example 2: The method of Example 1, wherein the virtual environment comprises a VR environment including 3D avatars of one or more users.

Example 3: The method of any of Examples 1-2, wherein the virtual environment comprises an AR environment comprising one or more AR holograms.

Example 4: The method of any of Examples 1-3, wherein the modified video stream is provided on a flat shape in the virtual environment.

Example 5: The method of any of Examples 1-4, further comprising: generating a 3D mesh based on the modified video stream; providing the modified video stream on the 3D mesh.

Example 6: The method of any of Examples 1-5, further comprising: providing in the video conference session a second video stream of the virtual environment.

Example 7: The method of any of Examples 1-6, further comprising: providing in the video conference session a second video stream of the virtual environment captured by a virtual camera located at a viewpoint of the digital representation of the video conferencing participant.

Example 8: The method of any of Examples 1-7, wherein the video conference session and virtual environment communicate via an SDK.

Example 9: The method of any of Examples 1-8, wherein the digital representation of the video conference participant is provided through an API.

Example 10: The method of any of Examples 1-9, further comprising: generating volumetric information, by a machine learning model, about the face of the video conference participant based on the modified video stream; generating a 3D mesh based on the volumetric information; providing the modified video stream on the 3D mesh.

Example 11: The method of any of Examples 1-10, wherein the boundary is determined by image processing.

Example 12: The method of any of Examples 1-11, wherein the digital representation of the video conference participant has an adjustable opacity.

Example 13: The method of any of Examples 1-12, further comprising: providing one or more user interface controls for selecting a location of the digital representation of the video conference participant in the virtual environment.

Example 14: The method of any of Examples 1-13, wherein the modified video stream is provided as a video sprite in the virtual environment.

Example 15: A non-transitory computer readable medium that stores executable program instructions that when executed by one or more computing devices configure the one or more computing devices to perform operations comprising: providing a video conference session in a virtual environment; receiving a video stream of a video conference participant; determining a boundary about the video conference participant in the video stream, wherein the boundary has an interior portion and an exterior portion, the interior portion depicting the video conference participant and the exterior portion depicting a background of the video conference participant; processing the video stream to generate a modified video stream comprising the interior portion depicting the video conference participant without the exterior portion depicting the background; providing the modified video stream in the virtual environment as a digital representation of the video conference participant.

Example 16: The non-transitory computer readable medium of Example 15, wherein the virtual environment comprises a VR environment including 3D avatars of one or more users.

Example 17: The non-transitory computer readable medium of any of Examples 15-16, wherein the virtual environment comprises an AR environment comprising one or more AR holograms.

Example 18: The non-transitory computer readable medium of any of Examples 15-17, wherein the modified video stream is provided on a flat shape in the virtual environment.

Example 19: The non-transitory computer readable medium of any of Examples 15-18, wherein the executable program instructions further configure the one or more computing devices to perform operations comprising: generating a 3D mesh based on the modified video stream; providing the modified video stream on the 3D mesh.

Example 20: The non-transitory computer readable medium of any of Examples 15-19, wherein the executable program instructions further configure the one or more computing devices to perform operations comprising: providing in the video conference session a second video stream of the virtual environment.

Example 21: The non-transitory computer readable medium of any of Examples 15-20, wherein the executable program instructions further configure the one or more computing devices to perform operations comprising: providing in the video conference session a second video stream of the virtual environment captured by a virtual camera located at a viewpoint of the digital representation of the video conferencing participant.

Example 22: The non-transitory computer readable medium of any of Examples 15-21, wherein the video conference session and virtual environment communicate via an SDK.

Example 23: The non-transitory computer readable medium of any of Examples 15-22, wherein the digital representation of the video conference participant is provided through an API.

Example 24: The non-transitory computer readable medium of any of Examples 15-23, wherein the executable program instructions further configure the one or more computing devices to perform operations comprising: generating volumetric information, by a machine learning model, about the face of the video conference participant based on the modified video stream; generating a 3D mesh based on the volumetric information; providing the modified video stream on the 3D mesh.

Example 25: The non-transitory computer readable medium of any of Examples 15-24, wherein the boundary is determined by image processing.

Example 26: The non-transitory computer readable medium of any of Examples 15-25, wherein the digital representation of the video conference participant has an adjustable opacity.

Example 27: The non-transitory computer readable medium of any of Examples 15-26, wherein the executable program instructions further configure the one or more computing devices to perform operations comprising: providing one or more user interface controls for selecting a location of the digital representation of the video conference participant in the virtual environment.

Example 28: The non-transitory computer readable medium of any of Examples 15-27, wherein the modified video stream is provided as a video sprite in the virtual environment.

Example 29: A system comprising one or more processors configured to perform the operations of: providing a video conference session in a virtual environment; receiving a video stream of a video conference participant; determining a boundary about the video conference participant in the video stream, wherein the boundary has an interior portion and an exterior portion, the interior portion depicting the video conference participant and the exterior portion depicting a background of the video conference participant; processing the video stream to generate a modified video stream comprising the interior portion depicting the video conference participant without the exterior portion depicting the background; providing the modified video stream in the virtual environment as a digital representation of the video conference participant.

Example 30: The system of Example 29, wherein the virtual environment comprises a VR environment including 3D avatars of one or more users.

Example 31: The system of Examples 29-30, wherein the virtual environment comprises an AR environment comprising one or more AR holograms.

Example 32: The system of Examples 29-31, wherein the modified video stream is provided on a flat shape in the virtual environment.

Example 33: The system of any of Examples 29-32, wherein the processors are further configured to perform the operations of: generating a 3D mesh based on the modified video stream; providing the modified video stream on the 3D mesh.

Example 34: The system of any of Examples 29-33, wherein the processors are further configured to perform the operations of: providing in the video conference session a second video stream of the virtual environment.

Example 35: The system of any of Examples 29-34, wherein the processors are further configured to perform the operations of: providing in the video conference session a second video stream of the virtual environment captured by a virtual camera located at a viewpoint of the digital representation of the video conferencing participant.

Example 36: The system of any of Examples 29-35, wherein the video conference session and virtual environment communicate via an SDK.

Example 37: The system of any of Examples 29-36, wherein the digital representation of the video conference participant is provided through an API.

Example 38: The system of any of Examples 29-37, wherein the processors are further configured to perform the operations of: generating volumetric information, by a machine learning model, about the face of the video conference participant based on the modified video stream; generating a 3D mesh based on the volumetric information; providing the modified video stream on the 3D mesh.

Example 39: The system of any of Examples 29-38, wherein the boundary is determined by image processing.

Example 40: The system of any of Examples 29-39, wherein the digital representation of the video conference participant has an adjustable opacity.

Example 41: The system of any of Examples 29-40, wherein the processors are further configured to perform the operations of: providing one or more user interface controls for selecting a location of the digital representation of the video conference participant in the virtual environment.

Example 42: The system of any of Examples 29-41, wherein the modified video stream is provided as a video sprite in the virtual environment.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
providing a video conference session in a virtual environment that is a three-dimensional virtual space and includes respective digital representations of conference participants of the video conference session;
placing a three-dimensional representation of a first conference participant of the conference participants in the virtual environment, wherein the first conference participant is an augmented or a virtual reality (AR/VR) conference participant;
receiving a video stream of a second video conference participant of the conference participants, wherein the second video conference participant is a non-AR/VR conference participant, and wherein the video stream is two-dimensional;
determining a boundary about the second video conference participant in the video stream, wherein the boundary has an interior portion and an exterior portion, the interior portion being a two-dimensional depiction of the second video conference participant and the exterior portion depicting a background of the second video conference participant;
processing the video stream to generate a modified video stream comprising the interior portion depicting the second video conference participant without the exterior portion depicting the background;
providing the modified video stream in the virtual environment as a digital representation of the second video conference participant, the digital representation being two-dimensional, and the virtual environment including the digital representation that is two-dimensional and the three-dimensional representation; and
providing in the video conference session a second video stream of the virtual environment captured by a virtual camera located at a viewpoint of the digital representation of the second video conference participant in the virtual environment.

2. The method of claim 1, wherein the virtual environment comprises a virtual reality (VR) environment.

3. The method of claim 1, wherein the virtual environment comprises an augmented reality (AR) environment comprising one or more AR holograms.

4. The method of claim 1, wherein the modified video stream is provided on a flat shape in the virtual environment.

5. The method of claim 1, further comprising:
generating a 3D mesh based on the modified video stream; and
providing the modified video stream on the 3D mesh.

6. The method of claim 1, further comprising:
providing in the video conference session a third video stream of the virtual environment.

7. The method of claim 1, wherein the virtual camera has at least one of a same location as the digital representation or a same facing direction as the digital representation.

8. A non-transitory computer readable medium that stores executable program instructions that when executed by one or more computing devices configure the one or more computing devices to perform operations comprising:
providing a video conference session in a virtual environment that is a three-dimensional virtual space and includes respective digital representations of conference participants of the video conference session;
placing a three-dimensional representation of a first conference participant of the conference participants in the virtual environment, wherein the first conference participant is an augmented or a virtual reality (AR/VR) conference participant;
receiving a video stream of a second video conference participant of the conference participants, wherein the second video conference participant is a non-AR/VR conference participant, and wherein the video stream is two-dimensional;
determining a boundary about the second video conference participant in the video stream, wherein the boundary has an interior portion and an exterior portion, the interior portion being a two-dimensional depiction of the second video conference participant and the exterior portion depicting a background of the second video conference participant;
processing the video stream to generate a modified video stream comprising the interior portion depicting the second video conference participant without the exterior portion depicting the background;
providing the modified video stream in the virtual environment as a digital representation of the second video conference participant, the digital representation being two-dimensional, and the virtual environment including the digital representation that is two-dimensional and the three-dimensional representation; and
providing in the video conference session a second video stream of the virtual environment captured by a virtual camera located at a viewpoint of the digital representation of the second video conference participant in the virtual environment.

9. The non-transitory computer readable medium of claim 8, wherein the virtual environment comprises a VR environment.

10. The non-transitory computer readable medium of claim 8, wherein the virtual environment comprises an AR environment comprising one or more AR holograms.

11. The non-transitory computer readable medium of claim 8, wherein the modified video stream is provided on a flat shape in the virtual environment.

12. The non-transitory computer readable medium of claim 8, wherein the executable program instructions further configure the one or more computing devices to perform operations comprising:
generating a 3D mesh based on the modified video stream; and
providing the modified video stream on the 3D mesh.

13. The non-transitory computer readable medium of claim 8, wherein the executable program instructions further configure the one or more computing devices to perform operations comprising:
providing in the video conference session a third video stream of the virtual environment.

14. The non-transitory computer readable medium of claim 8, wherein the virtual camera has at least one of a same location as the digital representation or a same facing direction as the digital representation.

15. A system comprising one or more processors configured to perform instructions to:
provide a video conference session in a virtual environment that is a three-dimensional virtual space and includes respective digital representations of conference participants of the video conference session;
place a three-dimensional representation of a first conference participant of the conference participants in the virtual environment, wherein the first conference participant is an augmented or a virtual reality (AR/VR) conference participant;
receive a video stream of a second video conference participant of the conference participants, wherein the second video conference participant is a non-AR/VR conference participant, and wherein the video stream is two-dimensional;
determine a boundary about the second video conference participant in the video stream, wherein the boundary has an interior portion and an exterior portion, the interior portion being a two-dimensional depiction of the second video conference participant and the exterior portion depicting a background of the second video conference participant;
process the video stream to generate a modified video stream comprising the interior portion depicting the second video conference participant without the exterior portion depicting the background;
provide the modified video stream in the virtual environment as a digital representation of the second video conference participant, the digital representation being two-dimensional, and the virtual environment including the digital representation that is two-dimensional and the three-dimensional representation; and
provide in the video conference session a second video stream of the virtual environment captured by a virtual camera located at a viewpoint of the digital representation of the second video conference participant in the virtual environment.

16. The system of claim 15, wherein the virtual environment comprises a VR environment.

17. The system of claim 15, wherein the modified video stream is provided on a flat shape in the virtual environment.

18. The system of claim 15, wherein the one or more processors configured to perform instructions to:
associate the virtual camera with a different location or a different facing direction.

19. The system of claim 15, wherein the video conference session and the virtual environment communicate via an SDK.

20. The system of claim 15, wherein the digital representation of the second video conference participant is provided through an API.

* * * * *